US010377125B2

United States Patent
Friend et al.

(10) Patent No.: US 10,377,125 B2
(45) Date of Patent: Aug. 13, 2019

(54) CONTROL SYSTEMS AND METHODS TO OPTIMIZE MACHINE PLACEMENT FOR ADDITIVE CONSTRUCTION OPERATIONS

(71) Applicant: Caterpillar Inc., Peoria, IL (US)

(72) Inventors: Paul Friend, Mortion, IL (US); Qi Chen, Dunlap, IL (US); Jean-Jacques Clar, Edelstein, IL (US)

(73) Assignee: Caterpillar Inc., Deerfield, IL (US)

( * ) Notice: Subject to any disclaimer, the term of this patent is extended or adjusted under 35 U.S.C. 154(b) by 238 days.

(21) Appl. No.: 15/373,600

(22) Filed: Dec. 9, 2016

(65) Prior Publication Data

US 2018/0162065 A1    Jun. 14, 2018

(51) Int. Cl.

| | | |
|---|---|---|
| *B29C 64/386* | (2017.01) | |
| *B33Y 30/00* | (2015.01) | |
| *B33Y 50/02* | (2015.01) | |
| *G05B 13/02* | (2006.01) | |
| *G05B 19/402* | (2006.01) | |
| *G05D 1/00* | (2006.01) | |

(52) U.S. Cl.
CPC ............ *B33Y 30/00* (2014.12); *B29C 64/386* (2017.08); *B33Y 50/02* (2014.12); *G05B 13/021* (2013.01); *G05B 19/402* (2013.01); *G05D 1/00* (2013.01); *G05B 2219/42217* (2013.01); *G05B 2219/49019* (2013.01); *G05B 2219/49068* (2013.01)

(58) Field of Classification Search
CPC ...... B33Y 30/00; B33Y 50/00; G05B 13/021; G05B 19/402; G05B 2219/42217; G05B 2219/49019; G05B 2219/49068; G05D 1/00; B29C 64/386
See application file for complete search history.

(56) References Cited

U.S. PATENT DOCUMENTS

| | | |
|---|---|---|
| 6,194,860 B1 | 2/2001 | Seelinger et al. |
| 7,865,285 B2 | 1/2011 | Price et al. |
| 8,644,964 B2 | 2/2014 | Hendron et al. |
| 8,718,837 B2 | 5/2014 | Wang et al. |
| 9,102,055 B1 | 8/2015 | Konolige et al. |

(Continued)

FOREIGN PATENT DOCUMENTS

CN      104416572 A      3/2015

*Primary Examiner* — Jacob T Minskey
*Assistant Examiner* — Cedrick S Williams
(74) *Attorney, Agent, or Firm* — Miller, Matthias & Hull

(57) ABSTRACT

A control system for a machine, operating on a worksite is associated with an implement, which perform additive construction operations in accordance with a pre-determined implement control plan. The system includes a positioning system, one or more implement control actuators, and a controller. The positioning system is configured to determine positioning signals associated with, at least, a terrain of the worksite and any worksite objects existing thereon. The controller determine an available zone, in which the machine and implement are capable of executing the additive construction operations within the available zone, based on the positioning signals and the pre-determined implement control plan, and determine an operation zone, relative to a desired additive construction site on the worksite, within the available zone, wherein parameters of the operation zone are based, at least in part, on the available zone, the machine configuration, and the pre-determined implement control plan.

20 Claims, 10 Drawing Sheets

(56) References Cited

U.S. PATENT DOCUMENTS

| | | | |
|---|---|---|---|
| 2008/0133128 A1* | 6/2008 | Koch | E02F 3/435 37/348 |
| 2009/0043462 A1 | 2/2009 | Stratton et al. | |
| 2013/0297046 A1 | 11/2013 | Hendron et al. | |
| 2014/0118533 A1 | 5/2014 | Chang | |
| 2014/0163805 A1* | 6/2014 | Braunstein | G05D 1/0276 701/23 |
| 2014/0188333 A1* | 7/2014 | Friend | E02F 9/261 701/34.4 |
| 2015/0142186 A1 | 5/2015 | Handique et al. | |
| 2015/0240453 A1* | 8/2015 | Jaliwala | E02F 9/2041 701/50 |
| 2016/0222630 A1 | 8/2016 | Friend | |

* cited by examiner

CONTROL SYSTEMS AND METHODS TO OPTIMIZE MACHINE PLACEMENT FOR ADDITIVE CONSTRUCTION OPERATIONS

TECHNICAL FIELD

The present disclosure generally relates to control systems for additive construction operations and, more particularly, to control systems and methods for positioning a machine and/or an associated additive construction implement, prior to or during an additive construction operation.

BACKGROUND

Additive construction may be implemented on worksites to create a structure based on a computer-implemented additive construction plan, which may be used to control a machine and/or an associated implement, to construct said structure. In some examples, utilizing work machines such as, but not limited to, excavators, tele-handlers, and gantry machines, such work machines may be used to control additive construction implements, in order to perform additive construction.

For controlling additive construction implements and their associated machines, various control systems are utilized to manually, autonomously, or semi-autonomously control movement of the machine and work implement in the X, Y, and Z directions, based, at least in part, on additive construction planning. For example, control systems for machines and implements can control orientation of the additive construction implement, such as, but not limited to, a roll, a pitch, and/or a yaw of the implement. Such control systems may utilize a controller to receive instructions from various sources (e.g., user controls, a memory, a remote control, etc.) and determine controls to execute via the control system. The control systems send signals to elements associated with the controller, such as motors or actuators, to position the additive construction implement in accordance with the determined controls.

In some control systems, a structure of the machine may be utilized by and actuated by the control system to control the position of the additive construction implement. These systems may use one or more actuators to control movement of the machine and/or implement while positioning the additive construction implement. However, control via such machine-associated components may not provide the desired control accuracy for additive construction implements and/or such components may not be configured or configurable for use in accordance with additive construction planning.

Some modern implement control systems, such as the control systems disclosed by U.S. Pat. No. 8,644,964 ("Method and System for Controlling Movement of an End Effector on a Machine"), may employ control schemes that transmit signals movement of a machine to moving elements of the control system (e.g., control of a crane of an excavator) and transmit signals for movement of the machine to other elements of the control system that are more directly associated with the implement, in accordance with an implement control plan. However, such signals do not provide instructions for specific positioning of the machine, relative to a worksite, for optimizing additive construction operations.

Accordingly, such prior known control systems and methods both do not provide for suitable accuracy for control, nor do they account for optimization of machine placement, prior to or during additive construction operations. Therefore, control systems and methods for positioning a machine and/or an associated additive construction implement, prior to or during an additive construction operation, are desired.

SUMMARY

In accordance with one aspect of the disclosure, a control system for a machine, operating on a worksite, is disclosed. The machine may be associated with an implement, which is configured to perform additive construction operations in accordance with a pre-determined implement control plan. The system may include a positioning system, one or more control actuators, and a controller. The positioning system may be configured to determine positioning signals associated with, at least, a terrain of the worksite and any worksite objects existing thereon. The one or more control actuators may be operatively associated with the implement and the machine and each of the one or more control actuators may be configured to position the implement, with respect to the machine, and capable of positioning the implement based on a machine configuration for the machine. The machine configuration may include an implement range of motion and a machine footprint. The controller, which includes a processor, may be configured to receive the positioning signals from the positioning system and determine an available zone, within the worksite, in which the machine and implement are capable of executing the additive construction operations within the available zone, based, at least, on the worksite positioning signals and the pre-determined implement control plan. The controller may be further configured to determine an operation zone, relative to a desired additive construction site on the worksite, within the available zone, wherein parameters of the operation zone are based, at least in part, on the available zone, the machine configuration, and the pre-determined implement control plan.

In accordance with another aspect of the disclosure, a method for optimizing positioning of a machine and an implement associated with the machine is disclosed. The implement may be configured for performing an additive manufacturing operation, at a worksite, in accordance with a pre-determined implement control plan. The machine may have a machine configuration, which includes an implement range of motion and a machine footprint. The method may include determining positioning signals associated with, at least, a terrain of the worksite and any worksite objects existing thereon. The method may further include determining an available zone, within the worksite, in which the machine and implement are capable of executing the additive construction operations within the available zone, determining of the available zone based, at least, on the positioning signals and the pre-determined implement control plan. The method may further include determining an operation zone, relative to a desired additive construction site on the worksite, within the available zone, parameters of the operation zone being configured based, at least in part, on the available zone, the machine configuration, and the pre-determined implement control plan.

In accordance with yet another aspect of the disclosure, a system for performing additive construction operations on a worksite is disclosed. The additive construction operations may be associated with a pre-determined implement control plan. The system may include an implement, a machine, a positioning system, and a controller. The machine may include one or more control actuators, one or more ground engaging devices configured to propel the machine upon the worksite, and a power source providing power to at least one of the one or more actuators and the one or more ground engaging devices to perform functions of the machine. The one or more actuators may be operatively associated with the implement and the machine and each of the one or more actuators may be configured to position the implement, with respect to the machine, and capable of positioning the implement based on a machine configuration for the machine. The machine configuration may include an implement range of motion and a machine footprint. The positioning system may be configured to determine positioning signals associated with, at least, a terrain of the worksite and any worksite objects existing thereon. The controller, which includes a processor, may be configured to receive the positioning signals from the positioning system and determine an available zone, within the worksite, in which the machine and implement are capable of executing the additive construction operations within the available zone, based, at least, on the positioning signals and the pre-determined implement control plan. The controller may be further configured to determine an operation zone, relative to a desired additive construction site on the worksite, within the available zone, wherein parameters of the operation zone are based, at least in part, on the available zone, the machine configuration, and the pre-determined implement control plan. The controller may further be configured to direct the one or more ground engaging devices of the machine to position the machine, within the operation zone, prior to executing the pre-determined implement control plan and direct the one or more actuators of the machine to control the implement for performing the additive construction operations in accordance with the pre-determined implement control plan.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
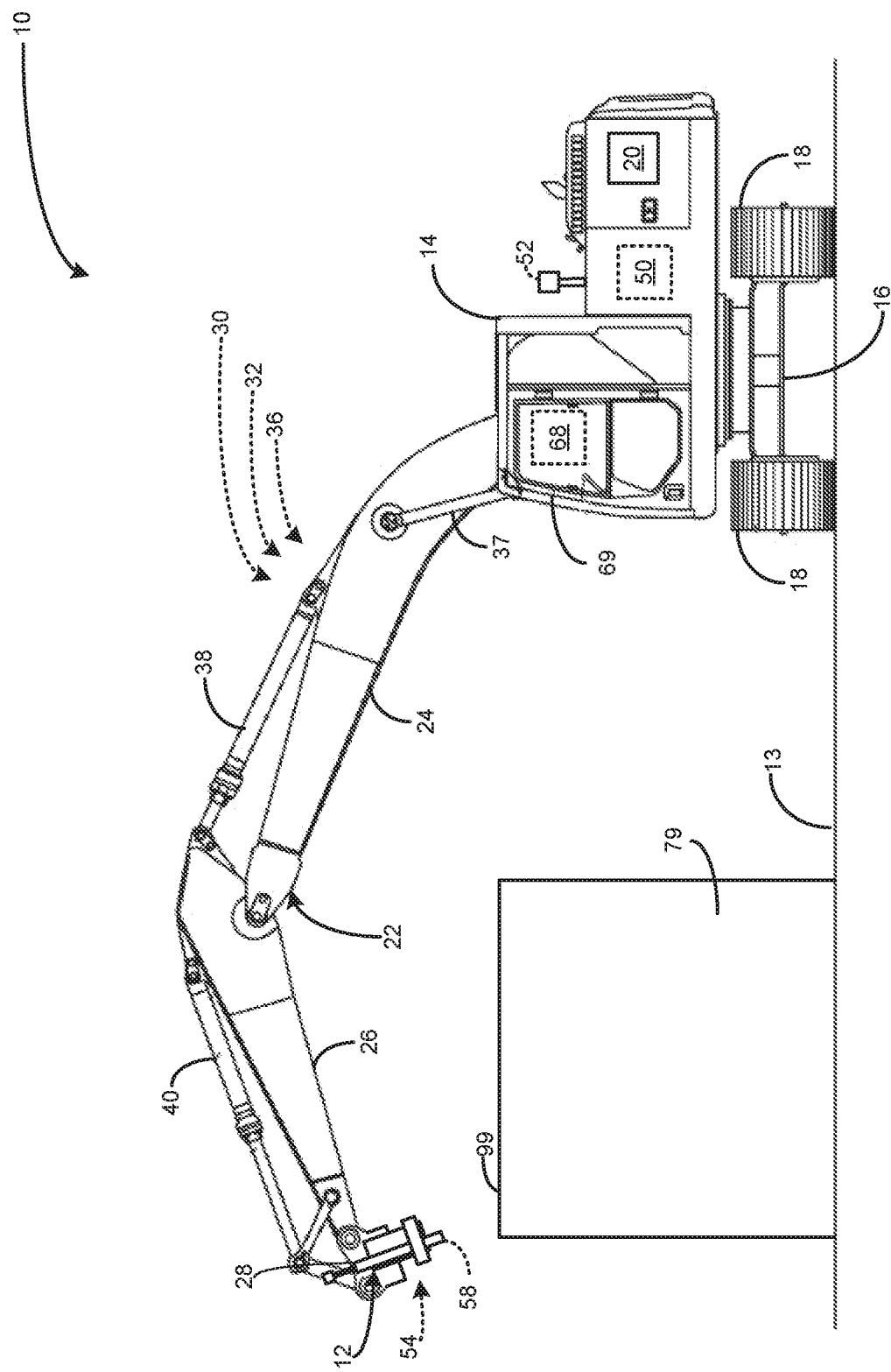
FIG. 1 is a side view of an example implement, an associated machine, and an associated control system, according to an embodiment of the present disclosure.

Turning now to the drawings and with specific reference to FIG. 1, a machine 10 having an implement 12 is illustrated in accordance with the teachings of the present disclosure. While the machine 10 in FIG. 1 is depicted, generally, as an excavator, the teachings of the present disclosure may relate to other work machines that employ control systems for an implement associated with said machine 10. The term "machine" as used herein may refer to any machine that performs some type of operation associated with an industry such as mining, construction, farming, transportation, or any other industry known in the art. For example, the machine 10 may be an earth-moving machine, a wheel loader, an excavator, a gantry machine and/or system, a dump truck, a backhoe, a material handler, or the like. Moreover, the implement 12 connected to the machine 10 may be an additive construction implement utilized for performing, large-scale three-dimensional printing, additive manufacturing, and any similar tasks known in the art.

As depicted in FIG. 1, the machine 10 may include a housing 14 disposed on top of and supported by an undercarriage 16. The undercarriage 16 may be associated with one or more ground engaging devices 18, which may be used for mobility and propulsion of the machine 10. The ground engaging devices 18 are shown as a pair of continuous tracks; however, the ground engaging devices 18 are not limited to being continuous tracks and may additionally or alternatively include other ground engaging devices such as rotatable wheels. A power system 20 is may provide power to the propel or otherwise move the ground engaging devices 18 and may include one or more power sources, such as internal combustion engines, electric motors, fuel cells, batteries, ultra-capacitors, electric generators, and/or any power source which would be known by a person having ordinary skill in the art. Such a power system 20 may further be used to power various motion of the implement 12 or any other elements and control systems associated with the machine 10 and/or implement 12.

For control of the implement 12, the machine may further include a crane 22, which may include a boom 24 operatively coupled with a stick 26. The implement 12 may be attached to the crane 22 at, for example, a distal end 28 of the stick 26. For positioning the implement 12, the crane 22 and, as associated elements, the boom 24 and stick 26, may be controlled by an implement control system 30. The control system 30 is shown in a schematic depiction in FIG. 2.

Figure 2:
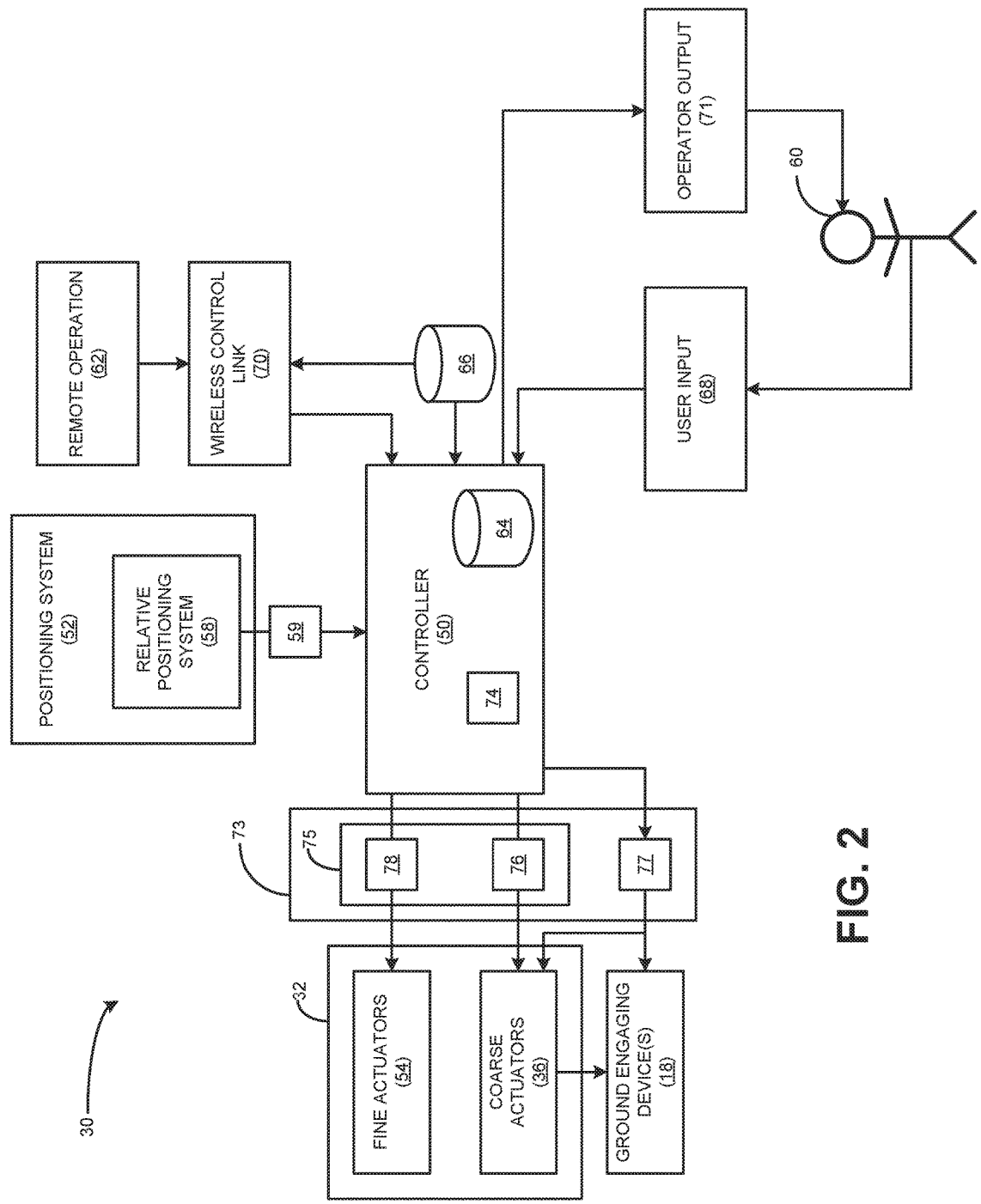
FIG. 2 is a schematic representation of the control system of FIG. 1, in accordance with the present disclosure and the embodiment of FIG. 1.

With reference to both FIGS. 1 and 2, the control system 30 may include one or more actuators 32, which, in some examples, may include a plurality of coarse control actuators 36 for positioning and/or otherwise moving the machine 10 and/or implement 12. The plurality of coarse control actuators 36 may include, but are not limited to including, hydraulic actuators, motors, or any other suitable device for receiving instructions to actuate a component of the machine 10, the implement 12, or any other component associated with the machine 10 which may affect motion of the machine 10 and/or implement 12. The plurality of coarse control actuators 36 may include one or more boom actuator(s) 37 for rotating, raising, lowering, and/or otherwise positioning the boom 24 relative to the housing 14 when said boom actuator(s) 37 are actuated. For controlling positioning of the stick 26 relative to the boom 24, the plurality of coarse control actuators 36 may include one or more stick actuator(s) 38, which may rotate, raise, lower, and/or otherwise position the stick upon actuation. The plurality of coarse control actuators 36 may further include implement actuator(s) 40 for controlling coarse positioning of the implement 12. Implement actuator(s) 40 may rotate, raise, lower, and/or otherwise position the implement 12 upon actuation.

To provide signals to the plurality of coarse control actuators 36 for actuation, the coarse control actuators 32 may include or be otherwise operatively associated with a controller 50. The controller 50 is operatively associated with the one or more actuators 32 and, in turn, the coarse control actuators 36. The controller 50 may further be used to control fine actuators 54.

The controller 50 may be used to control the implement 12 in a variety of autonomous, semi-autonomous, or manual modes. As used herein, an implement 12 of a machine 10 operating in an autonomous manner operates automatically based upon information received from various sensors without the need for human operator input. Further, control of an implement 12 of a machine 10 operating semi-autonomously may include input from an operator 60, either within the machine 10 or remotely, who performs some tasks or provides some input while other tasks are performed automatically based upon information received from various sensors. An implement 12 of a machine 10 being operated manually is one in which an operator 60 is controlling all or essentially all of the direction, speed and manipulating functions of the implement 12 of the machine 10. An implement 12 of a machine 10 may be operated remotely by an operator (e.g., a remote operation 62) in either a manual or semi-autonomous manner.

Operation of the implement 12, in any of the above referenced manners, may be executed by the controller 50. The controller 50 may be any electronic controller or computing system including a processor which operates to perform operations, execute control algorithms, store data, retrieve data, gather data, and/or any other computing or controlling task desired. The controller 50 may be a single controller or may include more than one controller disposed to control various functions and/or features of the implement 12 and the machine 10. Functionality of the controller 50 may be implemented in hardware and/or software and may rely on one or more data maps relating to the operation of the machine 10 and the implement 12. To that end, the controller 50 may include internal memory 64 and/or the controller 50 may be otherwise connected to external memory 66, such as a database or server. The internal memory 64 and/or external memory 66 may include, but are not limited to including, one or more of read only memory (ROM), random access memory (RAM), a portable memory, and the like. Such memory media are examples of nontransitory memory media.

User input 68 may be included with the control system 30 so that the operator 60 may have the ability to operate/control the implement 12 of the machine 10. For example, user input 68 may be provided within a cab 69 of the housing 14 of the machine 10, wherein the operator 60 may provide commands for the implement 12 when the machine 10 is operating in either a manual or semi-autonomous manner. The user input 68 may include one or more input devices through which the operator 60 may issue commands to control the implement 12 of the machine 10 by employing one or both of the coarse control actuators 32 and the fine actuators 34 of the control system 30.

In some examples, the system 30 may further include an operator output 71, which is operatively associated with the controller 50 and may provide output from the controller 50 to the operator 60. The operator output 71 may be configured to receive instructions from the controller 50 (e.g., instructions for manual or semi-autonomous control of the machine 10, for the operator 60) and present said instructions to the operator 60. The operator output 71 may include, for example, a visual display configured to present operation instructions to the operator 60.

Additionally or alternatively, the control system 30 may include a wireless control link 70 which is connected to a wireless network. Via the wireless control link 70, commands may be given to the implement 12 via the controller 50 from a remote operation 62 (e.g., a command center, a foreman's station, and the like). Further, information may be accessed from and/or stored to the external memory 66 using the wireless control link 70. In certain embodiments, control of the implement 12 via the control system 30 may be distributed such that certain functions are performed at the machine 10 level (e.g., by the operator 60 utilizing the user input 68) and other functions are performed via remote operation 62.

Further, the control system 25 may be configured to implement a pre-determined implement control plan 74. The pre-determined implement control plan 74 may be instructions stored on at least one of the internal memory 64 and/or the external memory 66 and executed by the controller 50. The pre-determined implement control plan 74 may be influenced by elements of the control system 30, such as any input or feedback from a positioning system 52, a relative positioning system 58, the user input 68, the remote operation 62, or any other conditions or controls associated with the implement 12 or the machine 10. The pre-determined implement control plan 74 may include one or more passes for a given task associated with the implement 12.

The pre-determined implement control plan 74 may be used by the controller 50 to determine control signals 73, which may include implement control signals 75 for controlling the implement 12 and/or the machine 10, in accordance with the pre-determined implement control plan 74 and any other modifying factors, as discussed below. The implement control signals 75 may include one or both of coarse control signals 76 and fine control signals 78. The coarse control signals 76 may be transmitted from the controller 50 to one or more of the coarse control actuators 36. The coarse control actuators 36, upon receiving the coarse control signals 76, may be actuated to execute coarse movements of the implement 12 in accordance with the pre-determined implement control plan 74 and any other modifying factors thereof. Similarly, the fine control signals 78 may be transmitted from the controller 50 to one or more of the fine actuators 54. Upon receiving the fine control signals 78, the fine actuators 54 may be actuated to perform fine movements of the implement 12 in accordance with the pre-determined implement control plan 74 and any other modifying factors thereof. "Fine movements" may be any movement of the implement 12 that has a range of motion that is less than the range of motion of the coarse movements.

In some examples, the pre-determined implement control plan 74 may include building-based or designing-based tool path instructions based on a digital model (e.g., a computer-aided drafting (CAD) model, a 3-D rendering, or any other digital model). Such path planning information and/or executable files are commonly known and used in various forms of additive construction and/or three-dimensional printing, wherein an object is formed by a machine based on a digital file, which provides a basis for control instructions to a machine or implement. For example, the pre-determined implement control plan 74 may execute instructions for additive construction using the machine 10 and the implement 12. Additive construction or manufacturing, also often referred to as three-dimensional printing, is a process of creating three-dimensional structures from a digital plan or design file. Such additive manufacturing plans and/or designs can be transformed into cross-sections and used to form successive layers to be laid by an additive manufacturing device. Any digital file that provides implement control instructions for path planning may be used as or as part of the pre-determined implement control plan 74, such as, but not limited to, a stereolithography (.stl) file format file, a Virtual Reality Modeling Language (VRML) format file, among other format files.

The pre-determined implement control plan 74 may include such digital plans and/or design files. In such examples, the implement 12 may be an additive construction device (e.g., an extruder) for laying down successive layers of material to construct a structure 79. In such a pre-determined implement control plan 74, instructions may include tool path instructions for the implement 12 that are generated based on a digital, three-dimensional model. The instructions may include successive layers of material to be laid until construction of the structure 79, to be manufactured, is completed. In such applications, precise control of the implement 12, using the control system 30, is required to properly and accurately lay the successive layers to construct the desired structure.

In some examples, the control signals 73 may further include machine movement signals 77, which may be transmitted to actuators or other devices, such as the ground engaging device(s) 18, in order to propel or otherwise move the machine 10, about the worksite 13. Such instructions may be based on, but are not limited to being based on, the pre-determined implement control plan 74, user input 68, information from the positioning system 52, and any other information useful in determining machine movement signals 77. In some examples, such as those discussed below, the machine movement signals 77 may include signals for directing the machine 10 to a specific position, prior to or during execution of an additive manufacturing operation.

Figure 3:
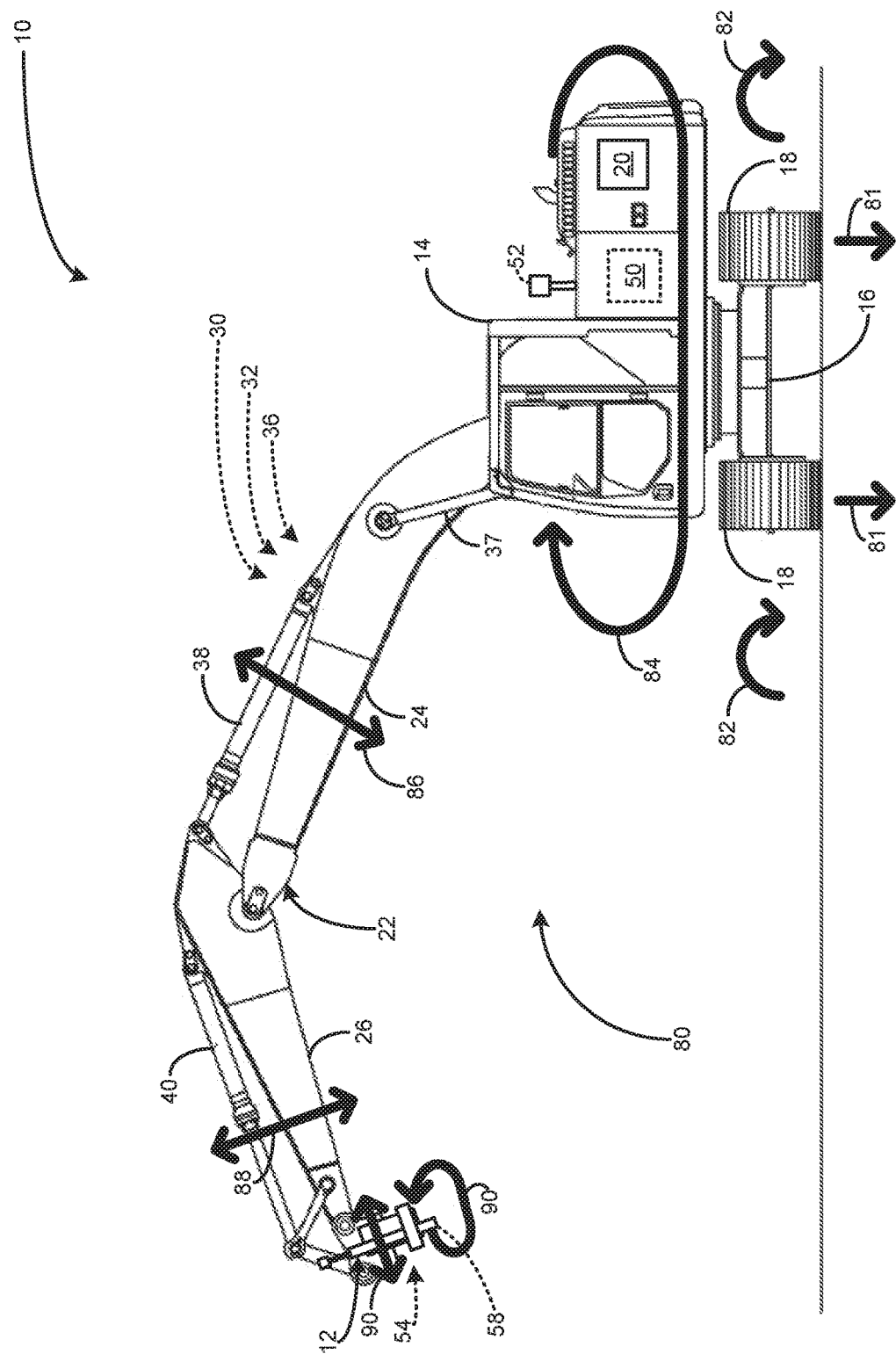
FIG. 3 is another side view of the example implement and machine of FIG. 1, but depicted showing functional characteristics of coarse control actuators associated with the control system depicted in FIGS. 1 and 2.

As mentioned above, the control system 30 includes the coarse control actuators 36, whose functions are further illustrated in FIG. 3 and described herein. In generating, implementing, optimizing, or otherwise affecting desired controls for the coarse control actuators 36, the controller 50 may receive and utilize information provided by the positioning system 52. In view of such desired controls, the coarse actuators 36 control coarse movement of the implement 12. For example, the coarse control actuators 36 may control movement of an implement in a range of motion that includes any motion plus or minus three inches along a desired path of movement instructed by the controller 50. However, this example is merely exemplary, and coarse movement controlled by the coarse control actuators 36 may be any range of motion which is greater than a range of motion of the fine control actuators 54.

In the non-limiting example of such coarse control actuators 36 and the non-limiting example motion instructions 80 shown in FIG. 3, the coarse control actuators 36 may control the initial placement of the machine 10 by transmitting propulsion instructions to the ground engaging member(s) 18 and/or transmitting rotation instructions 82 for the ground engaging members to one or both of the ground engaging member(s) 18 and the undercarriage 16. Additional actuators (not shown) for positioning the ground engaging member(s) 18 and the undercarriage 16 may also be included. The coarse control actuators 36 may further provide control of the rotational position of the housing 14 via transmitting housing rotation instructions 84, which may be received by the housing 14, the undercarriage 16, and/or any other actuator or further movement device associated with the coarse control actuators 36. The housing rotation instructions 84 may set a gross position for the crane 22.

The crane 22 may be further controlled by boom height instructions 86 transmitted to boom actuator(s) 37. The boom height instructions 86 may raise or lower the boom 24 in accordance with the desired path of motion for the implement 12. The implement 12 may be further raised or lowered upon actuation of arm actuator(s) 38 based on arm height instructions, which may be transmitted to the arm actuator(s) 38 by the controller 50. Further, the implement 12 may be further raised, lowered, or otherwise positioned via coarse implement instructions 90, which may be transmitted to and executed by the implement actuator(s) 40.

Figure 4:
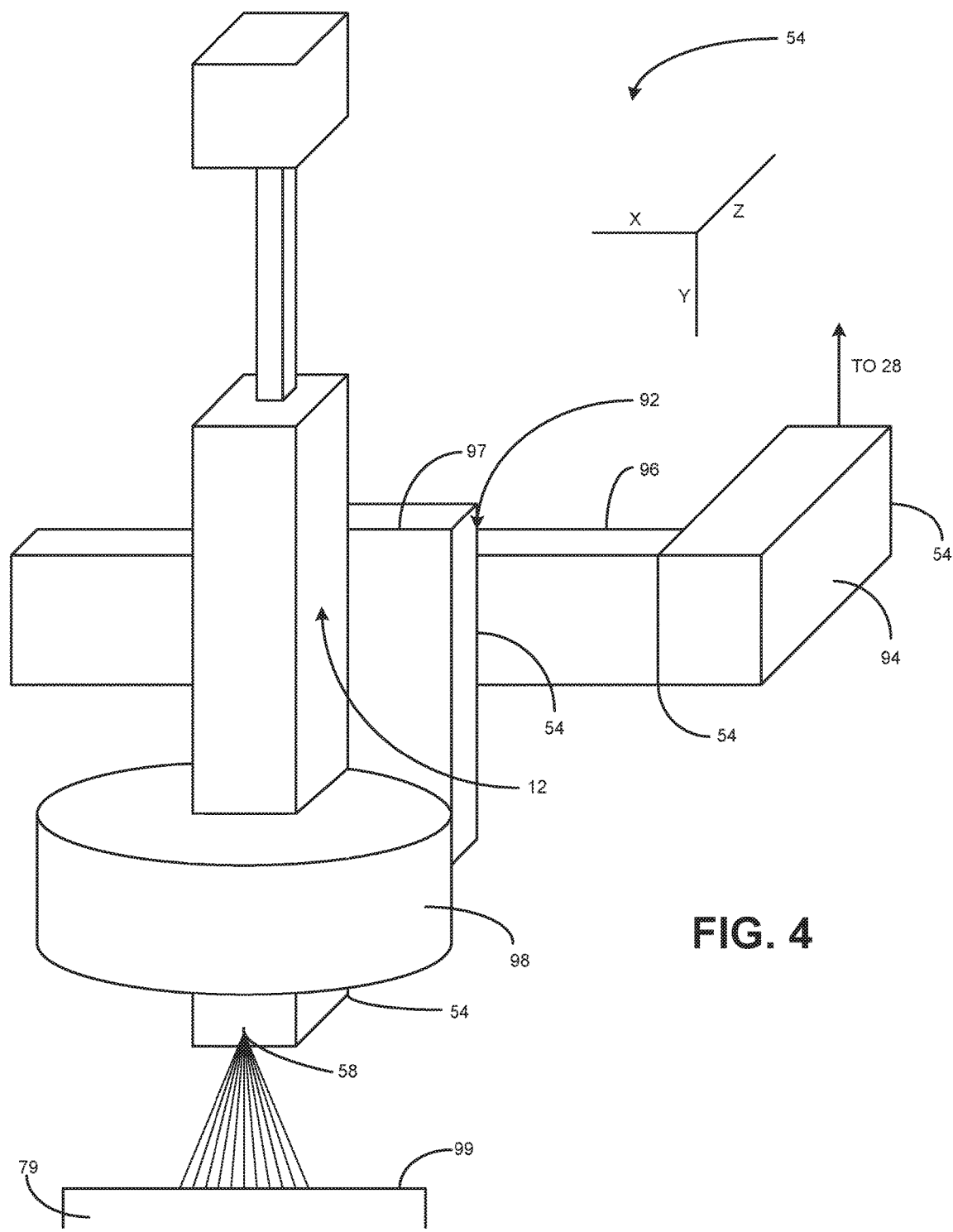
FIG. 4 is a three-dimensional perspective view of a fine control structure and fine actuators associated with the control system of FIG. 1 and depicted in a magnified fashion.

The implement 12 may be further positioned, moved, rotated, or otherwise controlled by the fine actuators 54. The fine actuators 54 may be used to execute fine movements necessary for positioning the implement 12. The "fine movements" executed by the fine actuators 54 may be any movement within any range of motion that is less than the range of motion of the coarse control actuators 36. For example, the fine actuators 54 may control movement of an implement 12 in a range of motion that includes any motion plus or minus two millimeters along a desired path of movement instructed by the controller 50. The fine actuators 54 are shown in a three-dimensional perspective view in FIG. 4. References to axes and planes, on which the depiction of the fine actuators 34 are disposed, are made in view of the depicted "X," "Y," and "Z" axes.

To control fine movement of the implement 12, the fine actuators 54 may include or be otherwise associated with a fine control structure 92, which may be positioned in response to actuation one or more of the fine actuators 54. The fine control structure 92 is operatively associated with the implement 12, but in some examples the fine control structure 92 may be considered a component of the implement 12 itself, while still controlled by the fine actuators 54. Alternatively, the fine control structure 92 may be a structure independent of the implement 12, wherein the implement is operatively associated with the fine control structure 92. The fine control structure 92 may further be attached, mounted to, or otherwise operatively associated with the stick 26 of the crane 22 at, for example, the distal end 28 of the stick 26. The fine actuators 54 may be located at and operatively connected to any location on the fine control structure 92 where the fine actuators 54 may be useful for positioning the implement 12. For example, and as shown, the fine actuators 54 may be located at connective points of positioning components of the fine control structure 92. Further, the fine actuators 54 may include, but are not limited to including, hydraulic actuators, motors, or any other suitable device for receiving instructions to position the implement 12 via, for example, the fine control structure 92.

The fine control structure 92 may be comprised of one or more associated components which pivot and/or otherwise move about any of the x, y, and/or z-axes to position the implement 12. Movement of elements of the fine control structure 92 may result from actuation of one or more of the fine actuators 54 in response to the fine control signals 78. In the non-limiting example of FIG. 4, the fine control structure 92 includes a first leg 94 that may connect to the distal end 28 of the stick 26 and shown extending along the z-axis, a second leg 96 that may pivotally connect to the first leg 94 and shown extending along the x-axis, a first mount 97 that may be connected to the second leg 96 and on which the implement 12 may be mounted, and a second mount 98 that may be connected to one or both of the implement 12 and the first mount 97 and may be able to rotate the implement 12. When actuated using one or more of the fine actuators 54, the first leg 94 may rotate, raise, lower, or otherwise move the implement 12 with respect to the positioning of the stick 26, as it may be connected to the distal end 28 of the stick 26. The second leg 96 may be pivotally connected to the first leg 94 and may rotate, raise, lower, or otherwise move the implement 12 with respect to the positioning of the first leg 94, when actuated by the fine actuators 54. The first mount 97 may be attached or otherwise operatively associated with the second leg 96 and may allow provide connection between the second leg 96 and the implement 12, such that it allows the implement 12 to move with the motion of the second leg 96, when moved by actuation of the fine actuators 54. In some examples, the first mount 97 may be movable with respect to the plane on which the second leg 96 is disposed. For example, the first mount 97 may be mounted to the second leg 96 via a track mount that allows the first mount 97 to move along the length of the second leg 96. Additionally, the second mount 98 may be used to further rotate the implement 12 along any plane on which the implement 12 is already positioned by upstream elements of the fine actuators 54.

Feedback for determining both coarse controls and fine controls for a control scheme (e.g., the implement control plan 74) may be provided by the positioning system 52 and/or the relative positioning system 58, which, in some examples, may be considered part of or associated with the positioning system 52. The positioning system 52 may be employed to determine absolute positioning of the implement 12 and/or the machine 10 relative to a worksite. The positioning system 52 may include one or more GPS sensors for detecting locations of the machine 10 or one or more elements of the machine 10 relative to the worksite 13. Other elements of the positioning systems 52 may include, but are not limited to including, perception based system sensors, and laser position detection systems, total station receivers, ranging radios, single or dual Global Navigation Satellite System (GNSS) receivers, and the like. All elements of the positioning systems 52 may be used to determine the real time actual positioning of the implement 12 and/or the machine 10. Of course, other elements aiding in detecting positioning of implement 12 and/or the machine 10 or the worksite 13 may be included and input from other sensors or receivers may also be used in determining the positioning of the implement 12 and/or the machine 10.

For relative position sensing, the relative positioning system 58 provides further feedback to the controller 50, which may be used for forming or influencing control instructions (e.g., the implement control plan 74) and/or altering existing control instructions. The relative positioning system 58 may include one or more perception sensors for determining positioning relative to a past operation of the machine. For example, the relative positioning system 58 may include one or more cameras, LiDAR system, or any other perception sensing device. LiDAR is a radar-like remote sensing technology that measures distance by illuminating a target with a laser and analyzing the reflected light (the term LiDAR is a portmanteau of "light" and "radar"). The relative positioning system 58 may generate images to be processed by the controller 50 and used to determine future positioning for the implement 12. In the example shown in FIG. 4, the relative positioning system 58 may be used to detect an edge 99 of the structure 79.

The ability of the relative positioning system 58 to determine relative position of the implement for use in future position may be useful when the pre-determined implement control plan 74 requires multiple passes to perform a task. Returning to the aforementioned, non-limiting example, where the implement 12 is an additive construction device, the controller 50 may determine where the implement 12 should be positioned, in accordance with the pre-determined implement control plan 74, when executing the next pass for adding a next layer to the structure 79. Feedback from the relative positioning system 58 may be utilized by the controller 50 to provide instructions to align the implement on top of the last pass, because the signals provided by the relative positioning system 58 from the previous pass can detect the edge 99 of the materials of the structure 79 laid in the previous pass.

Any input from any devices that comprise the positioning system 52 and/or the associated relative positioning system 58 may be utilized to determine, at least, a terrain or terrain information of the worksite 13. The positioning system 52 may include, amongst the elements described above or any additional elements, a plurality of individual sensors that cooperate to provide signals to the controller 50, to indicate the position of the machine 10 and/or topographical characteristics of a work surface, such as a terrain topography of the worksite 13. Using the positioning system 52, the controller 50 may determine the position of the machine 10 within the worksite 13, as well as determine positioning of the machine 10 relative to said terrain. With said information, a terrain, such as a real-time or static mapping of the worksite 13 and any objects or machines thereon, may be generated by the controller 50 based on information within the positioning signals 59 indicative of the terrain of the worksite 13 and any worksite objects existing thereon.

While the positioning system 52 and elements thereof, such as the relative positioning system 58, are depicted as on or operatively associated with the machine 10 and/or the implement 12, the positioning system 52 and elements thereof need not be attached to or otherwise operatively associated with the machine, so long as the positioning system 52 is capable of producing positioning signals 59 associated with the worksite 13, the machine 10, the implement 12, and/or any other objects present on the worksite 13. Accordingly, the positioning system 52 and/or certain elements thereof may exist detached from the machine 10, so long as they are capable of providing positioning signals 59 that include information indicative of a terrain of the worksite 13 and any objects existing thereon.

Accordingly, positioning signals 59, determined by the positioning system 52, may be utilized by the controller 50 for determining optimal positioning for the machine 10 prior to, during, or after additive construction operations. By utilizing the positioning signals 59, in conjunction with the pre-determined implement control plan 74 and a machine configuration 100, discussed below, the controller 50 may determine one operation zones and/or optimal machine positioning, within the worksite 13, in which additive construction operations, based on the pre-determined implement control plan 74, may be performed.

Figure 5:
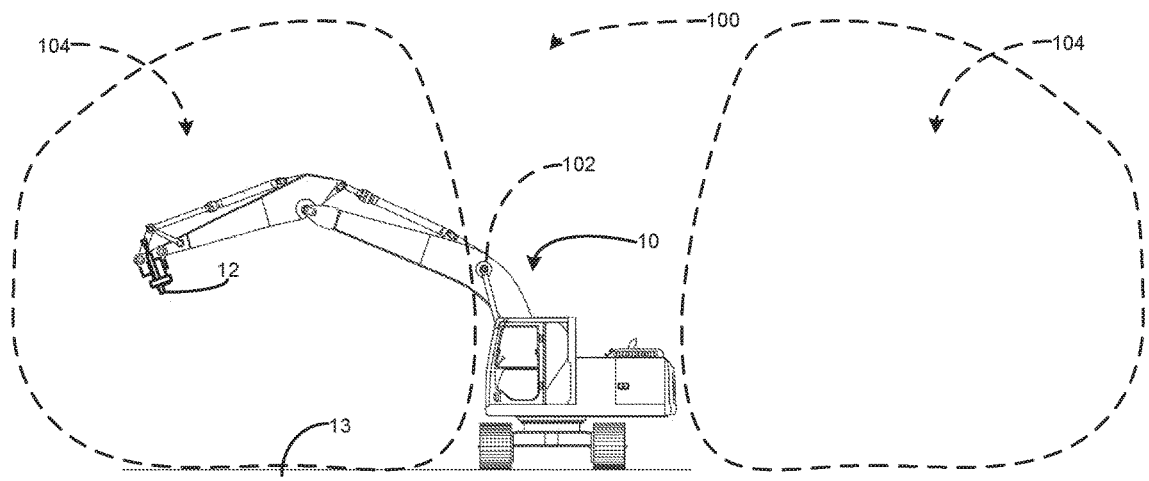
FIG. 5 is a side view of the example implement and associated machine of FIG. 1, illustrating a machine configuration of the machine, in accordance with an embodiment of the disclosure.
Figure 6:
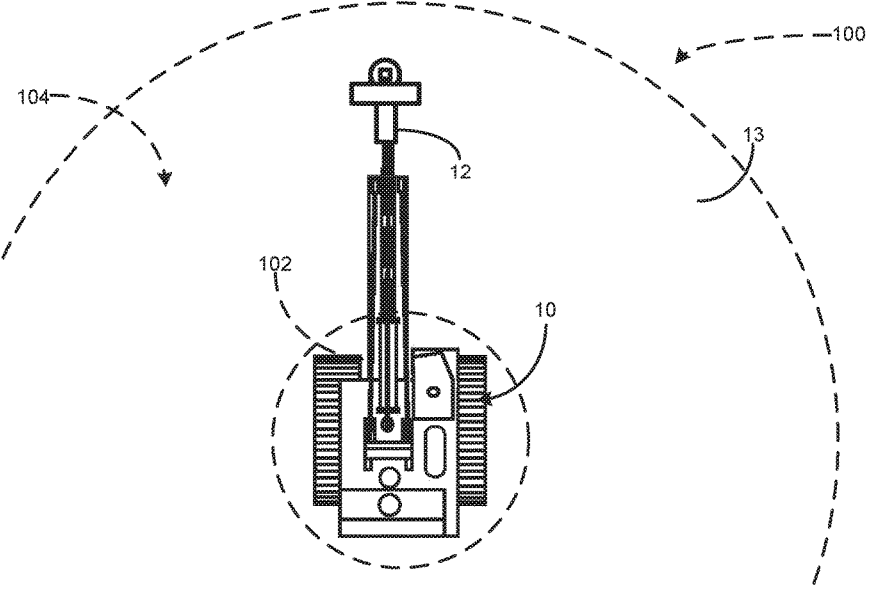
FIG. 6 is a top view of the example implement and associated machine of FIGS. 1 and 5, illustrating the machine configuration of FIG. 5, in accordance with an embodiment of the disclosure.

Turning now to FIGS. 5 and 6, the machine configuration 100 is illustrated, with respect to the worksite 13, having elements thereof denoted by dashed lines. The machine configuration 100, as defined herein, refers to the actual and potential spaces, volumes, areas, of a worksite, in which the machine 10 and/or implement 12 may occupy prior to, during, or after performing certain tasks on a worksite. In the given example of FIGS. 5 and 6, the machine configuration 100 includes, at least, a machine footprint 102 and an implement range of motion 104. The machine footprint 102 defines any physical spaces, volumes, and/or areas, along with any magnitudes thereof, within the worksite 13, that are occupied by the machine 10 prior to, during, or after performing tasks on the worksite 13. In other words, the machine footprint 102 may be the physical occupancy of the machine 10, including its size, weight, dimensional characteristics, and/or any other space-consumption metrics of the machine 10.

Further, the implement range of motion 104, as defined in FIGS. 5-7 and 11, is the range of motion in which the implement 12 may perform tasks, such as additive construction operations. Accordingly, the implement range of motion may be constrained and/or enabled by the range of motion provided by elements of the machine 10 (e.g., the crane 22) and the one or more actuators 32. Within the implement range of motion 104, the machine 10 and implement 12 may perform additive construction operations. Accordingly, the one or more actuators 32 are capable of positioning the implement 12 based on the machine configuration 100.

As discussed above, the controller 50 may be configured to utilize, at least, the positioning signals 59, the pre-determined implement control plan 74, the machine configuration 100, and any other additional information, to determine optimal positioning, for the machine 10, prior to, during, or after additive construction operations. To that end, FIGS. 7-11 illustrate a series of top views 113 of the worksite 13, with information superimposed upon the top view 113, indicative of characteristics and/or information useful for determining optimal positioning or useful in visually depicting elements of such optimization. A structure area 174, corresponding directly with the pre-determined implement control plan 74, indicates an area, volume, and/or space within the worksite 13, in which, upon completion of the implement control plan 74, will be occupied by the structure 79. The structure area 174 is denoted and called out by lines having an alternating "dot and dash" pattern. Similar to FIGS. 5-6, the machine configuration 100 and any elements thereof are denoted by dashed lines.

Figure 7:
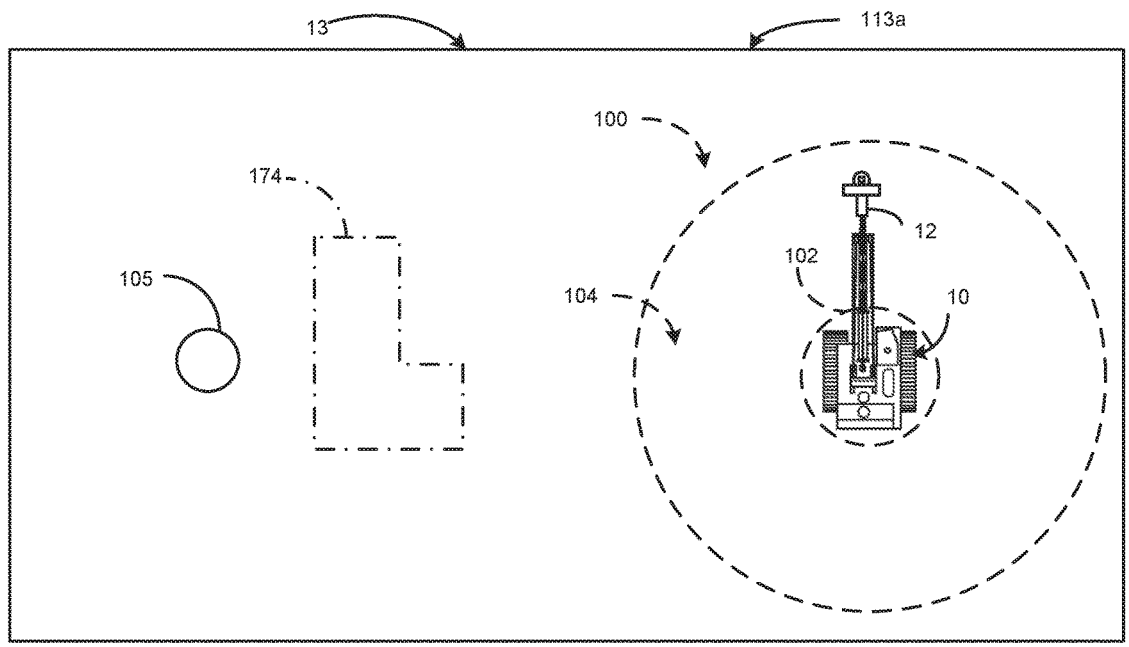
FIG. 7 is a top view of an example worksite, upon which the machine and implement of FIGS. 1-6 perform an additive construction operation, illustrating the machine configuration of FIGS. 5-6 and a pre-determined implement control plan super-imposed thereupon, in accordance with an embodiment of the disclosure.
Figure 8:
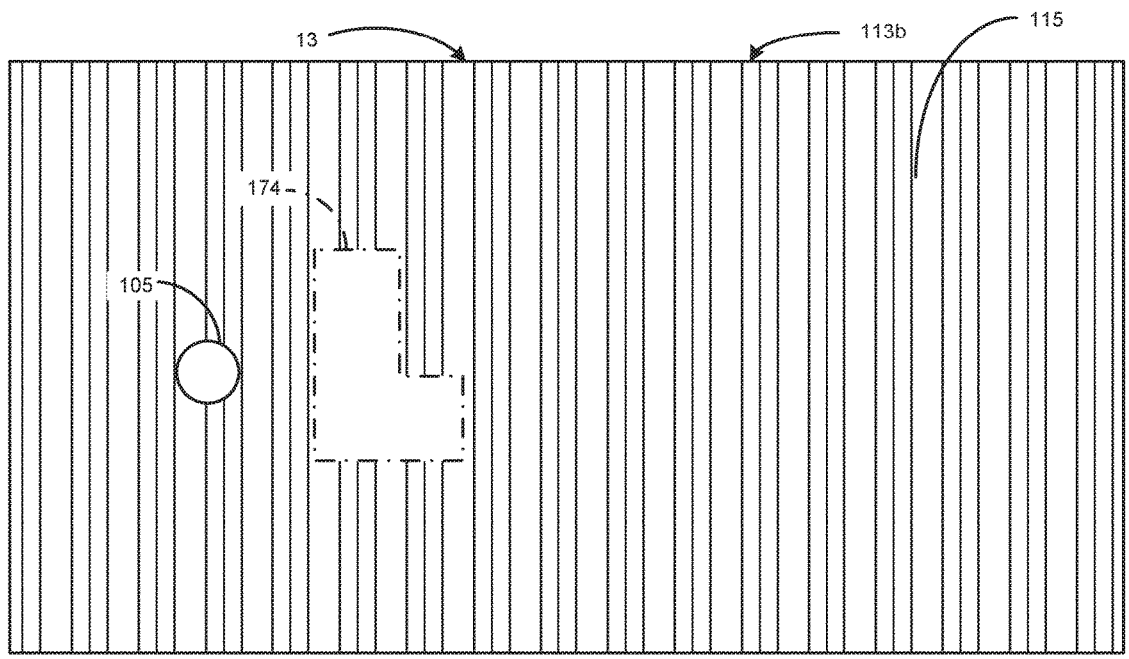
FIG. 8 is another top view of the example worksite of FIG. 7, illustrating an available zone in which the machine may be positioned during execution of the pre-determined implement control plan, in accordance with FIG. 7 and the present disclosure.
Figure 9:
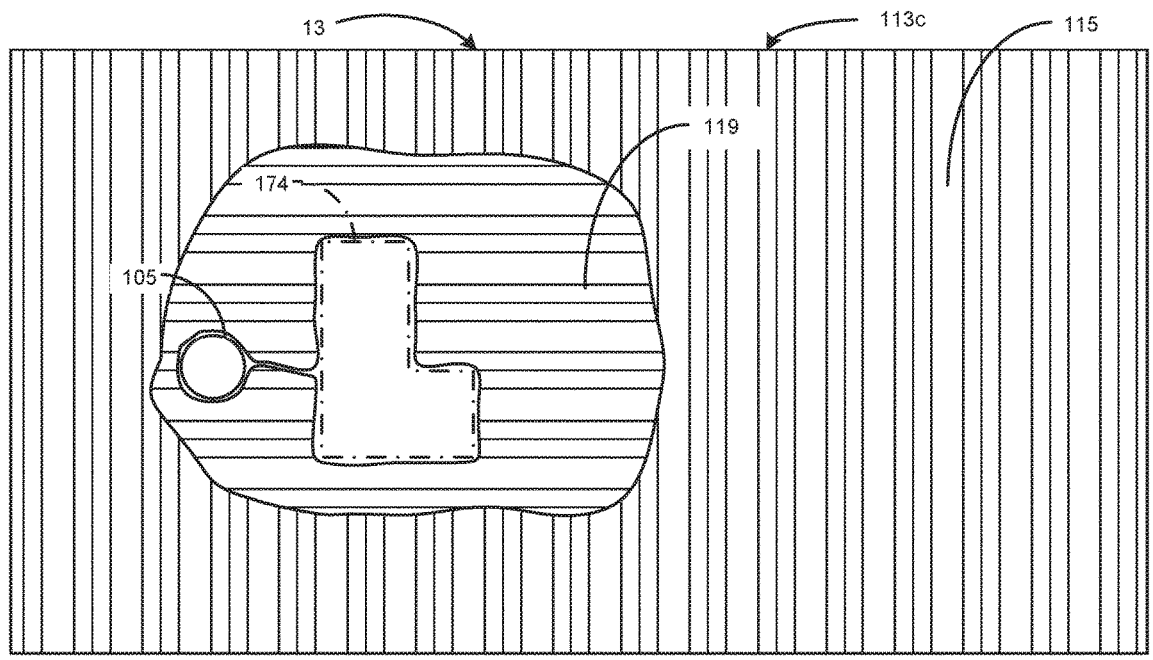
FIG. 9 is yet another top view of the example worksite of FIGS. 7 and 8, illustrating an operation zone, in which the machine may execute the pre-determined implement control plan, in accordance with FIGS. 7, 8, and the present disclosure.
Figure 10:
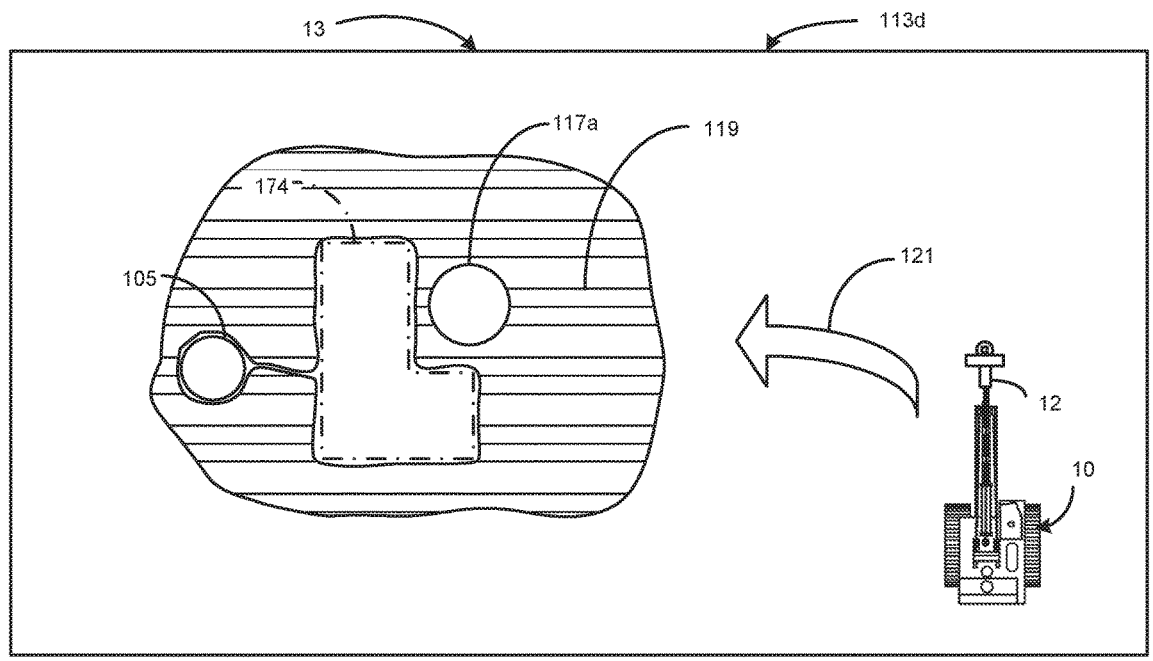
FIG. 10 is yet another top view of the example worksite of FIGS. 7-9, illustrating the operation zone and an optimum construction position for the machine, in accordance with FIGS. 7-9 and the present disclosure.
Figure 11:
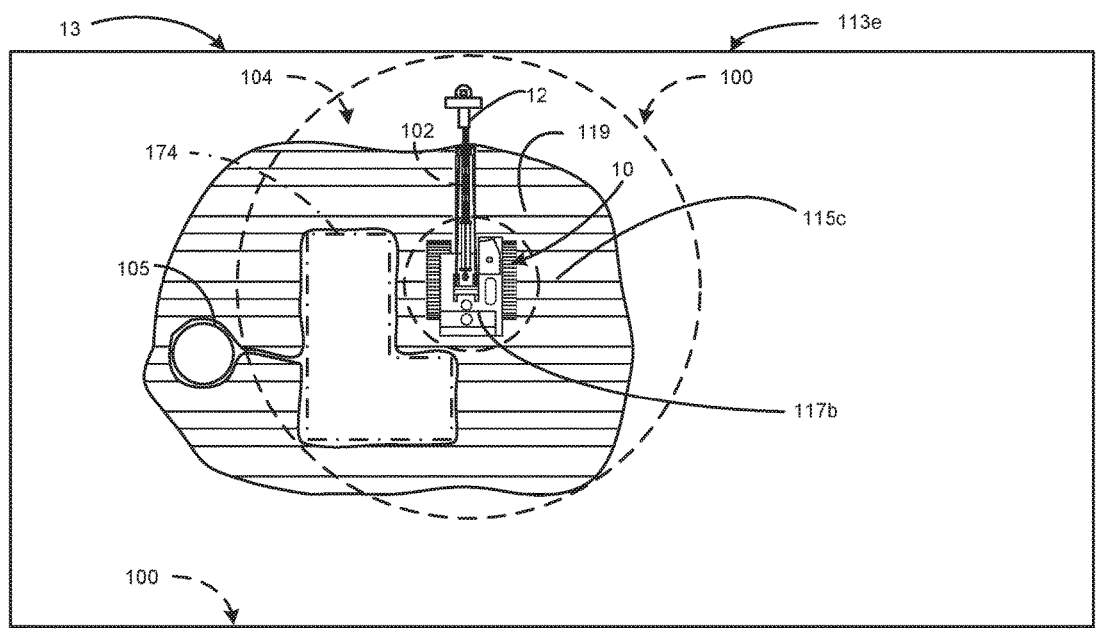
FIG. 11 is yet another top view of the example worksite of FIGS. 7-10, illustrating the operation zone and the machine being positioned proximate to the optimum construction position, in order to perform additive construction operations.

FIG. 7 illustrates a first top view 113a of the worksite 13 for the purposes of showing an example in which the structure area 174 exists, relative to the machine 10 existing in the same worksite 13. The first top view 113a may be indicative of a terrain, generated from or indicative of the positioning signals 59, of the worksite 13, having the structure area 174 and, optionally, any obstructions 105 on the worksite 13 indicated. Of course, the top views 113 illustrated herein may not be to scale and are merely exemplary for describing functions of the controller 50 and/or control system 30.

The information illustrated by FIGS. 7-11 may be illustrative of the worksite 13, especially its terrain, as the positioning signals 59 may be received by the controller 50 from the positioning system 52. The controller 50 may then determine an available zone 115 within the worksite 13, relative to a desired additive construction site, such as the structure area 174. The available area is any space, volume, or area within the worksite 13 in which the machine 10 and implement 12 are capable of executing additive construction operations and is denoted in the second top view 113b of FIG. 8 by horizontal hatching. The available zone 115 may refer to any area on the worksite 13 in which it is physically possible for the machine 10 to lie prior to, during, or after additive construction operations. Accordingly, as the available zone 115 indicates area in which the machine 10 may be positioned prior to, during, or after performance of the pre-determined implement control plan 74. The available zone 115, for example, may include any area, space, or volume of the worksite 13 that is outside of the structure area 174 and/or any obstructions 105 on the worksite. Obstructions 105 may be any object or physical presence, which may obstruct additive construction operations on the worksite 13 (e.g., trees or other vegetation, geological structures, other machines and equipment, etc.).

The controller 50 may further be configured to determine an operation zone 119, relative to a desired additive construction site on the worksite 13, such as the structure area 174, within the available zone 117. The operation zone 119 is illustrated in the third top view 113c of FIG. 9, denoted by horizontal hatching. Parameters of the operation zone 119 may be based, at least in part, on the available zone 115, the machine configuration 100, and the pre-determined implement control plan 74. For example, parameters of the operation zone 119 may be configured by determining an area that includes any location in which the machine 10 may lie and its implement range of motion 104 intersects with the structure area 174. Therefore, in such an area, the positioning of the machine 10 would enable at least some of the additive construction operations to be completed, in accordance with the pre-determined implement control plan 74.

The operation zone 119 may, therefore, exclude the structure area 174 and, optionally, exclude any area occupied by any obstructions 105.

In some examples, the controller 50 may further be configured to determine instructions 121 for directing the machine 10 to move into the operation zone 119 prior to or during performance of additive construction operations. As shown in in the fourth top view 113d of FIG. 10, the instructions 121 may be any direction based communication which, if executed by either an operator (e.g. manual or semi-autonomous controls) or a controller (e.g., autonomous control) will result in the machine 10 being positioned within the operation zone 119. Accordingly, in some examples wherein the control system 30 includes the operator output 71, the operator output 71 may be configured to receive the instructions 121 from the controller 50 and present said instructions 121 to the operator 60 of the machine 10. Alternatively, in examples wherein the controller 50 is configured to autonomously control one or both of propulsion and steering of the machine 10, such autonomous control may be based on the instructions 121.

In some examples, the controller 50 may be further configured to refine the potential positioning of the machine 10, prior to or during performance of an additive construction operation, within the operation zone 119. In such examples and as shown in the fourth top view 113 d of FIG. 10, the controller 50 may be further configured to determine an optimum construction position 117a, based, at least in part, on the pre-determined implement control plan 74. In such examples, the instructions 121 may be for directing the machine 10 to move to a location 117b, which is proximate to the optimum construction position 117a, the location 117b illustrated in the fifth top view 113e of FIG. 11.

The optimum construction position 117a may be based on one or more deciding factors which can optimize construction of the structure 79, based on the pre-determined implement control plan 74. Such factors may be utilized to optimize one or both of construction costs and construction efficiency. For example, determining the optimum construction position 117a, for the machine 10, may include determining it such that the machine 10 and implement 12, when positioned at the optimum construction position 117a, would be capable of performing the additive construction operations, in accordance with the pre-determined implement control plan 74, using a minimum number of machine movements (e.g., the movements described with reference to FIG. 3). In such scenarios for determining the optimum construction position 117a, the chosen position for the optimum construction position 117a may have less necessary movement, for completing the pre-determined implement control plan 74, in comparison to the necessary movements at other positions within the operation zone 119. Additionally or alternatively, determining of the optimum construction position 117a for the machine 10 may include configuring the optimum construction position 117a for cost effectiveness based on a cost analysis of a cost assigned to movements, by the machine 10 and implement 12, needed to perform the additive construction operation, from the optimum construction position 117a, in accordance with the pre-determined implement control plan 74. The cost analysis used in such examples may include one or more of an analysis of fuel cost, an analysist of cost of operator or worker time, an analysis of the cost of machine wear, an analysis of cost of machine working time, and/or any other economic or cost factor associated with operation of the machine 10 and/or the implement 12. Accordingly, such cost analysis may be optimized by comparing cost analyses at different positions within the operator zone 119 and selecting the most cost optimized position, for use as the optimum construction position 117a.

As described above, obstructions 105 may exist within the worksite 13 and may be indicated during analysis of the positioning signals 59. In such examples, the controller 50 may be further configured to detect any obstructions 105, within the available zone 115, based on the positioning signals 59 and, if an obstruction 105 is detected, determine positioning of the obstruction 105 based on the positioning signals 59. In such examples, determining of one or both of the operation zone 119 and the optimum construction position 117a may be further based on the positioning of the obstruction 105.

Further, in examples wherein the machine 10, the implement 12, and the control system 30 are used in conjunction as, or as part of, a system for performing additive construction operations on the worksite 13, the controller 50 may be further configured to perform said additive construction operations, once positioning of the machine 10, on the worksite 13, is optimized. Accordingly, the controller 50 may further be configured to direct the one or more ground engaging devices 18 to position the machine 10 within the operation zone 119 and/or position the machine 10 proximate to the optimum construction position 117a, prior to executing the pre-determined implement control plan 74. Further, the controller may be configured to direct the one or more actuators 32 of the machine 10 to control the implement 12 for performing the additive construction operations in accordance with the pre-determined implement control plan 74.

INDUSTRIAL APPLICABILITY

The present disclosure generally relates to control systems for additive construction operations and, more particularly, to control systems and methods for positioning a machine and/or an associated additive construction implement, prior to or during an additive construction operation. As shown above, the control system 30 may be employed for control of an excavator; however, the systems and methods of the present disclosure may be applied to any work machines performing additive construction. Further, such machines may include one or more implements to be controlled by the present disclosure's systems and methods, such implements may include, but are not limited to including, additive construction implements and similar tools for constructing structures based on control plans.

Figure 12:
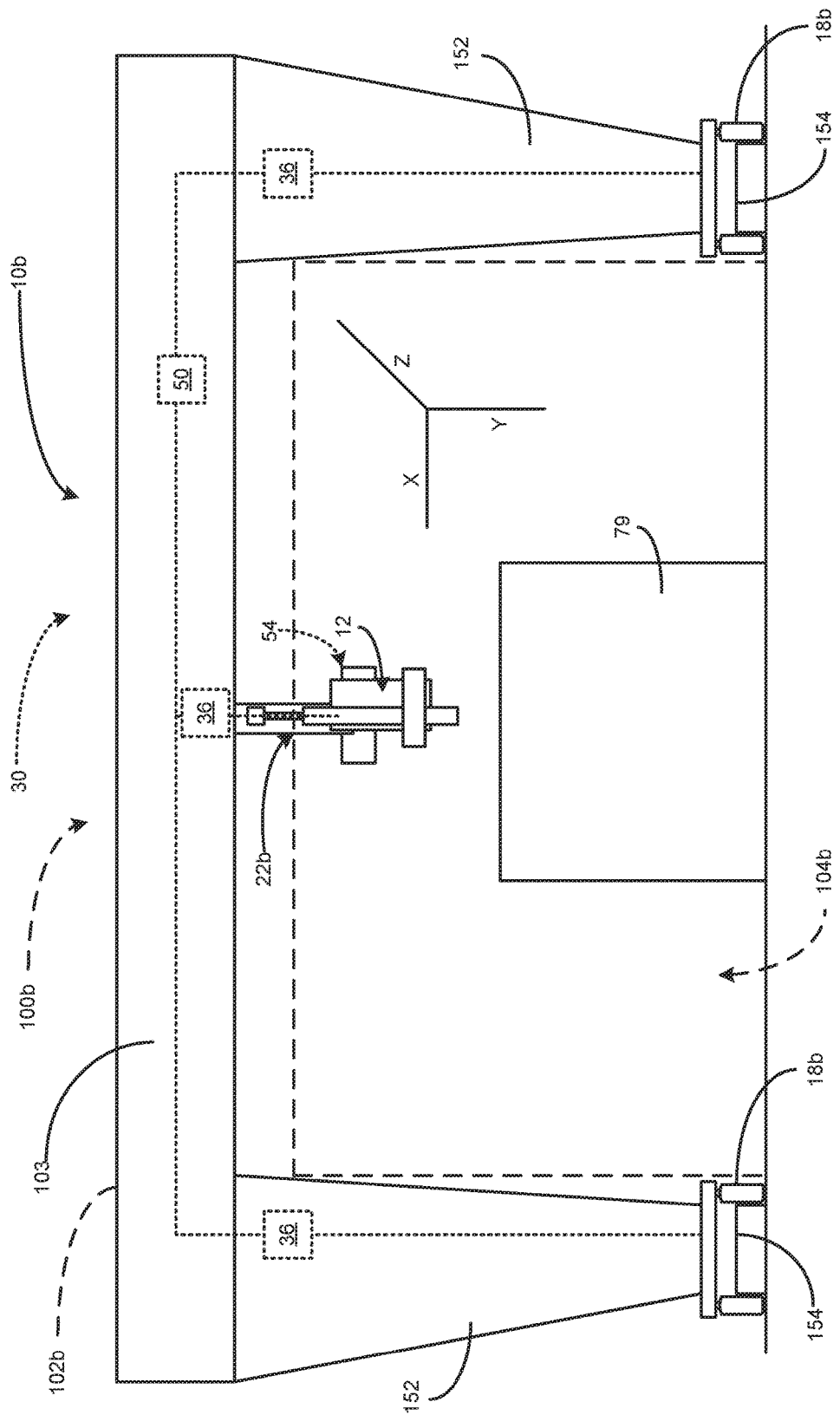
FIG. 12 is a side view of another example machine, with which the implements and control systems illustrated and described, with reference to FIGS. 1-11, may also be utilized, in accordance with an embodiment of the present disclosure.

As mentioned, the control system 30 for the implement 12, and any other control systems or methods disclosed herein, are not limited to use with the machine 10 shown in FIGS. 1-7 and 9-11, which are discussed above. For example, as shown in FIG. 12, the control system 30 may be utilized to control an alternative machine 10b, in accordance with the systems and methods disclosed herein. The machine 10b depicted in FIG. 12 is a gantry-type machine utilized to control the implement 12, when performing functions in accordance with a pre-determined implement control plan 74, such as the pre-determined implement control plan 74. The machine 10b may include two or more legs 152 positioned, generally, perpendicular with respect to the direction of gravity, which, as depicted, means the legs 152 extend in the "Y" coordinate direction along a Y axis. The legs 152 may each be attached to or operatively associated with ground engaging devices 18b, which may move the machine 10b with respect to the worksite 13 and, in turn, position the implement 12 during or after motion of the machine 10b. In some examples, movement of the machine 10b, via the ground engaging devices 18b, may be constrained or guided by tracks 154, around which the ground engaging devices 18b are positioned and propel along. The ground engaging devices 18b, whether guided by the tracks 154 or not, may move the machine 10b and, in turn, the implement 12 along a Z-axis, as shown.

The machine 10b may further include a horizontal scaffold 103 positioned substantially perpendicular to the legs 152, which is also attached to or otherwise operatively connected to the legs 152, thereby moving with the legs 152 in response to propulsion from the ground engaging device(s) 18b. The horizontal scaffold 103 may be operatively associated with a gantry crane 22b, which may move the implement 12 along an X-axis, with respect to the horizontal scaffold 103. For example, the gantry crane 22b may be connected to the horizontal scaffold 103 via a track (not shown) and may be positioned upon the track, along the X-axis, with respect to the horizontal scaffold 103, by being positioned by one or more of the coarse actuators 36. Further, the gantry crane 22b may position the implement 12 along the Y axis via extension of the gantry crane 22b, retraction of the gantry crane 22b, or other positioning of the gantry crane 22b by another object or coarse actuator 36, relative to the horizontal scaffolding 103.

Accordingly, the control system 30 may control positioning of the implement 12, in accordance with the pre-determined implement control plan 74 by utilizing the machine 10b. In doing so, the control system 30 may utilize the coarse actuators 36 to perform coarse movements of the machine 10b, in positioning the implement 12, while, similar to the machine 10, also utilizing the fine actuators 54 to finely position the implement 12, in accordance with the pre-determined implement control plan 74.

In the examples wherein the implement 12 is an additive construction implement 12, the machine 10b may be utilized in conjunction with the control system 30, in accordance with the pre-determined implement control plan 74, to additively construct the structure 79, in accordance with the systems and methods disclosed herein. Furthermore, the systems and methods disclosed herein may further be utilized to determine operation zones for the machine 10b, in which optimal placements for the machine 10b may be determined based on, at least, the pre-determined implement control plan 74, the positioning signals 59, and a machine configuration 100b for the machine 10b, which includes, at least, a machine footprint 102b and an implement range of motion 104b.

Of course, while the machines 10, 10b are illustrated herein, it is certainly contemplated that the systems and methods of the present disclosure may be applied to other types of machines and, certainly, the systems and methods of the present disclose are not limited to application in conjunction with the machines 10, 10b.

Figure 13:
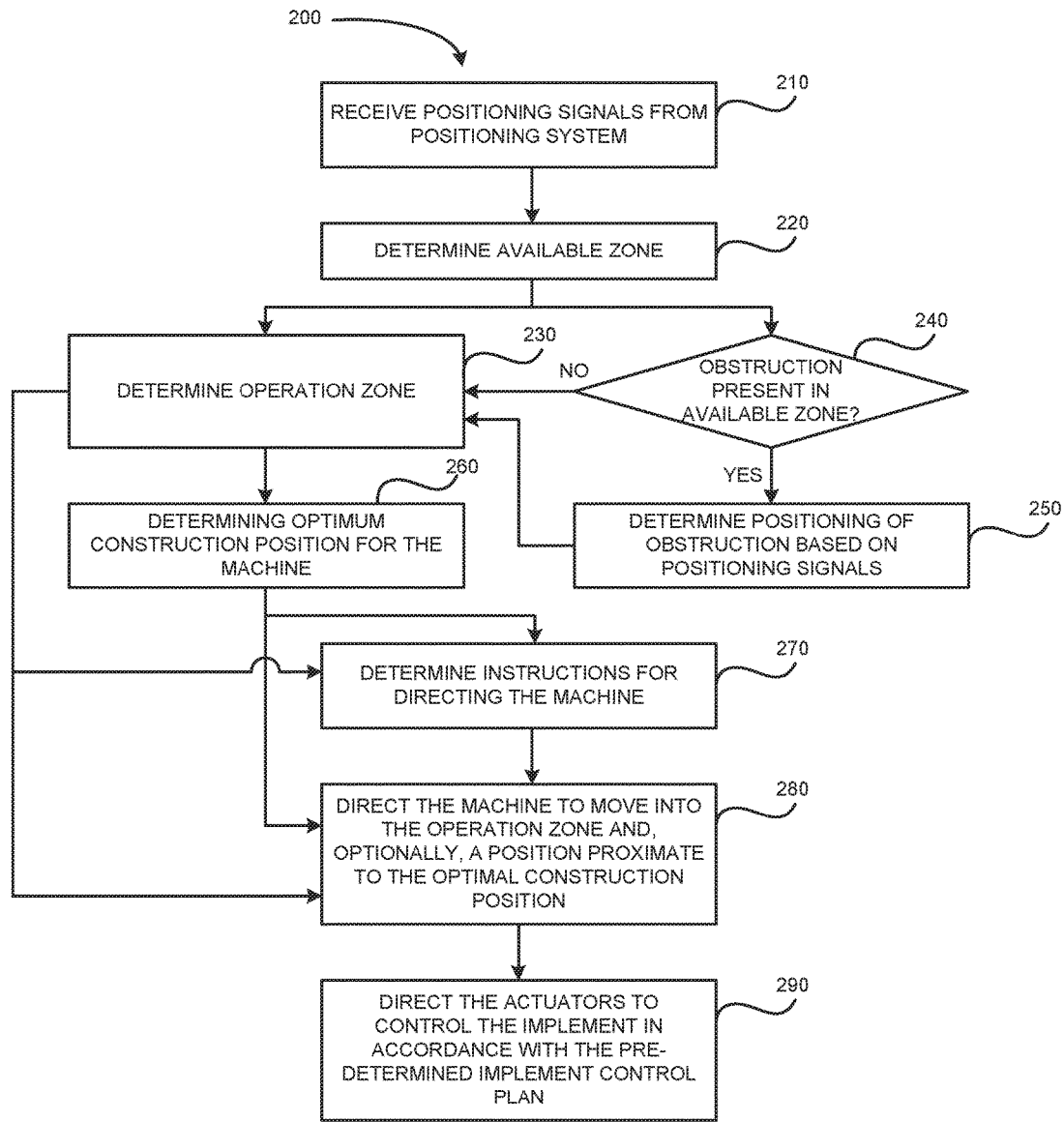
FIG. 13 is a flow chart representative of a method for optimizing positioning of a machine and an implement associated with the machine, in accordance with the present disclosure.

By utilizing the systems and methods, herein, for optimizing machine positioning prior to, during, or after additive construction operations, using any mentioned machines, the disclosed systems and methods may increase efficiency and/or cost effectiveness of additive construction operations, as discussed above. To that end, FIG. 13 illustrates a flowchart for an example method 200 for optimizing positioning of a machine and an implement associated with the machine. The method 200 is described, below, with reference to elements of the machine 10, the implement 12, and the associated control system 30, as described in detail above with reference to FIGS. 1-11. However, the method 200 is certainly not limited to application in conjunction with the machine 10, the implement 12 and/or the associated control system 30 and the method 200 is capable of being performed on or using other, machines, implements, and/or control systems.

The method 200 may begin at block 210, wherein the positioning signals 59 are determined by, for example, the positioning system 52 and are associated with, at least, a terrain of the worksite 13 and any objects thereon. At block 220, the method 200 includes determining the available zone 115, within the worksite 13, in which the machine 10 and implement 12 are capable of executing the additive construction operations, within the available zone 115. Determining of the available zone 115, at block 220, may be based, at least, on the positioning signals 59 and the pre-determined implement control plan 74. The method 200 may further include, at block 230, determining an operation zone 119, relative to a desired additive construction site (e.g., the structure area 174) and within the available zone 115. Parameters of the operation zone 119 being configured based, at least in part, on the available zone 115, the machine configuration 100, and the pre-determined implement control plan 74.

In some examples, the method 200 may include determining if an obstruction 105 is present in the available zone 115, as depicted by the decision 240. If an obstruction 105 is not present in the available zone 115, the method 200 continues to block 230. However, if an obstruction 105 is determined to be present in the available zone 115, then the method continues to block 250, wherein positioning of the obstruction 105 is determined based on the positioning signals 59 and the method 200, then, continues to block 230, wherein determining the operation zone 119 is further based on the positioning of the obstruction 105 determined at block 250.

In some examples, the method 200 may include determining the optimum construction position 117a for the machine 10, within the operation zone 119, based, at least in part, on the pre-determined implement control plan 74, as depicted in block 260. In some examples, determining the optimum construction position 117a, for the machine 10, may result in optimizing positioning of the machine 10 such that the machine 10 and implement 12, when positioned at the optimum construction position 117a, would be capable of performing the additive construction operations, in accordance with the pre-determined implement control plan 74, using a minimum number of machine movements. In such scenarios for determining the optimum construction position 117a, the chosen position for the optimum construction position 117a require less necessary movement, for completing the pre-determined implement control plan 74, in comparison to the necessary movements at other positions within the operation zone 119. Additionally or alternatively, determining of the optimum construction position 117a for the machine 10 may result in optimizing the optimum construction position 117a for cost effectiveness. The optimization of cost that may be achieved in such examples may optimize fuel cost, cost of operator or worker time, cost of machine wear, cost of machine working time, and/or may further optimize any other economic or cost factors associated with operation of the machine 10 and/or the implement 12.

Based on, the operation zone 119 and, optionally, the optimum construction position 117a, the method 200 may further include determining instructions for directing the machine 10 to move into the operation zone 119 and/or a location 117b proximate to the optimum construction position 117a, prior to or during performance of additive construction operations, as depicted in block 270, and direct the machine to move into the operation zone 119 based on said determined instructions, as depicted in block 280. Accordingly, the method 200 may then direct one or more actuators 32 of the machine 10 to control the implement 12 for performing the additive construction operations, in accordance with the pre-determined implement control plan 74, as depicted in block 290.

While the disclosed systems and methods are useful in additive manufacturing applications using the above described machines, implements, and their equivalents, the disclosed systems and methods are certainly not limited to use in additive manufacturing applications using the above described machines, implements, and their equivalents.

It will be appreciated that the present disclosure provides fine control systems for implements of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for a machine operating on a worksite, the machine associated with an implement configured to perform an additive construction operation in accordance with a pre-determined implement control plan, the system including:
   a positioning system configured to determine positioning signals associated with, at least, a terrain of the worksite and any worksite objects existing thereon;
   one or more control actuators operatively associated with the implement and the machine, each of the one or more actuators configured to position the implement, with respect to the machine, the one or more control actuators being capable of positioning the implement based on a machine configuration for the machine, the machine configuration including an implement range of motion and a machine footprint; and
   a controller, including a processor, configured to:
      receive the positioning signals from the positioning system;
      determine an available zone, within the worksite, in which the machine and implement are capable of executing the additive construction operations within the available zone, based, at least, on the positioning signals and the pre-determined implement control plan;
      determine an operation zone, relative to a desired additive construction site on the worksite, within the available zone, parameters of the operation zone based, at least in part, on the available zone, the machine configuration, and the pre-determined implement control plan; and
      direct the implement to perform the additive construction operation in accordance with the pre-determined implement control plan.

2. The control system of claim 1, wherein the controller is further configured to determine instructions for directing the machine to move into the operation zone prior to or during performance of the additive construction operations.

3. The control system of claim 2, further comprising an operator output operatively associated with the controller and configured to
   receive the instructions for directing the machine from the controller, and
   present the instructions for directing the machine to an operator of the machine.

4. The control system of claim 2, wherein the controller is further configured to autonomously control propulsion and steering of the machine based on the instructions for directing the machine.

5. The control system of claim 1, wherein the controller is further configured to determine an optimum construction position for the machine, within the operation zone, based, at least in part, on the pre-determined implement control plan.

6. The control system of claim 5, wherein the controller is further configured to determine instructions for directing the machine to move to a location proximate to the optimum construction position prior to or during performance of the additive construction operations.

7. The control system of claim 5, wherein determining the optimum construction position for the machine, by the controller, includes determining the optimum construction position such that the machine and implement, when positioned at the optimum construction position, would be capable of performing the additive construction operations from the optimum construction position using a minimum number of machine movements.

8. The control system of claim 5, wherein determining the optimum construction position for the machine, by the controller, includes configuring the optimum construction position for cost effectiveness based on a cost analysis of costs assigned to movements, by the machine and implement, necessary to perform the additive construction operation from the optimum construction position.

9. The control system of claim 1, wherein the controller is further configured to:
   detect any obstructions within the available zone, based on the positioning signals, and
   determine, if an obstruction is detected, positioning of the obstruction based on the positioning signals, and
   wherein determining the operation zone, by the controller, includes configuring the parameters of the operation zone based, further, on the positioning of the obstruction.

10. The control system of claim 1, wherein the machine includes a housing and a crane and wherein at least one of the one or more actuators is configured to move the crane, with respect to the housing, when positioning the implement with respect to the worksite, and
   wherein the implement positioning range of motion is constrained by, at least a range of motion for the crane.

11. A method for optimizing positioning of a machine and an implement associated with the machine, the implement configured for performing an additive construction operation, at a worksite, in accordance with a pre-determined implement control plan, the machine having a machine configuration, the machine configuration including an implement range of motion and a machine footprint, the method comprising:
   determining positioning signals associated with, at least, a terrain of the worksite and any worksite objects existing thereon;
   determining an available zone, within the worksite, in which the machine and implement are capable of executing the additive construction operations within the available zone, and determining of the available zone is based, at least, on the positioning signals and the pre-determined implement control plan;
   determining an operation zone, relative to a desired additive construction site on the worksite, within the available zone, parameters of the operation zone being configured based, at least in part, on the available zone, the machine configuration, and the pre-determined implement control plan; and directing the implement to perform the additive construction operation in accordance with the pre-determined implement control plan.

12. The method of claim 11, further comprising:

determining instructions for directing the machine to move into the operation zone prior to or during performance of the additive construction operations; and directing the machine to move into the operation zone, prior to or during performance of the additive construction operations, based on the instructions.

13. The method of claim 11, further comprising determining an optimum construction position for the machine, within the operation zone, based, at least in part, on the pre-determined implement control plan.

14. The method of claim 13, further comprising directing the machine to move to a location proximate to the optimum construction position, prior to or during performance of the additive construction operations.

15. The method of claim 11, further comprising:

detecting any obstructions within the available zone, based on the positioning signals; and determining, if an obstruction is detected, positioning of the obstruction based on the positioning signals, and wherein determining the operation zone includes configuring the parameters of the operation zone based, further, on the positioning of the obstruction.

16. A system for performing additive construction operations on a worksite, the additive construction operations associated with a pre-determined implement control plan, the system comprising:

an implement configured to additively construct a structure in accordance with the pre-determined implement control plan;

a machine including:

one or more control actuators operatively associated with the implement, each of the one or more actuators configured to position the additive construction implement, with respect to the machine, the one or more implement control actuators being capable of positioning the additive construction implement based on a machine configuration for the machine, the machine configuration including an implement range of motion and a machine footprint;

one or more ground engaging devices configured to propel the machine upon the worksite; and a power source providing power to at least one of the one or more implement control actuators and the one or more ground engaging devices, to perform functions of the machine;

a positioning system configured to determine positioning signals associated with, at least, a terrain of the worksite and any worksite objects existing thereon;

a controller, including a processor, operatively associated with the machine and the implement, and configured to:

receive the positioning signals and machine positioning signals from the positioning system;

determine an available zone, within the worksite, in which the machine and additive construction implement are capable of executing the additive construction operations within the available zone, based, at least, on the positioning signals and the pre-determined implement control plans;

determine an operation zone, relative to a desired additive construction site on the worksite, within the available zone, parameters of the operation zone based, at least in part, on the available zone, the machine configuration and the pre-determined implement control plan;

direct the one or more ground engaging devices of the machine to position the machine within the operation zone prior to executing the pre-determined implement control plan; and direct the one or more control actuators of the machine to control the implement for performing the additive construction operations in accordance with the pre-determined implement control plan.

17. The system of claim 16, wherein the controller is further configured to determine an optimum construction position for the machine, within the operation zone, based, at least in part, on the pre-determined implement control plan, and wherein directing the one or more ground engaging devices of the machine to position the machine within the operation zone, prior to executing the pre-determined implement control plan, is further based on the optimum construction position for the machine.

18. The system of claim 16, wherein the controller is further configured to:

detect any obstructions within the available zone, based on the worksite positioning signals, and determine, if an obstruction is detected, positioning of the obstruction based on the worksite positioning signals, and wherein determining the operation zone, by the controller, includes configuring the parameters of the operation zone based, further, on the positioning of the obstruction.

19. The system of claim 16, wherein directing the one or more ground engaging devices of the machine, by the controller, to position the machine within the operation zone prior to executing the pre-determined implement control plan is performed by autonomously controlling propulsion of the ground engaging devices, by the controller.

20. The system of claim 16, wherein directing the one or more implement control actuators of the machine, by the controller, to control the implement for performing the additive construction operations in accordance with the pre-determined implement control plan further includes directing the implement to deposit materials along a toolpath of the pre-determined implement control plan.

* * * * *